115,816

UNITED STATES PATENT OFFICE.

WILLIAM BROOKS, OF SOUTH CANTON, MASSACHUSETTS, ASSIGNOR TO HIMSELF AND ISAAC C. FISHER, OF SAME PLACE.

IMPROVEMENT IN VARNISHES FOR COATING THE SURFACES OF BOBBINS OR SPOOLS.

Specification forming part of Letters Patent No. 115,816, dated June 13, 1871.

*To all persons to whom these presents may come:*

Be it known that I, WILLIAM BROOKS, of South Canton, of the county of Norfolk and State of Massachusetts, have invented a new and useful Liquid Composition to be applied to the Surfaces of Spinning-Bobbins or Spools in order to prevent adhesion of fibrous matters thereto, it being also useful for other purposes in the arts; and I do hereby declare the same to be fully described, as follows:

In making the said composition I take one pound of gum shellac, one gallon of spirits of wine, one quarter of a pound of gum sandarach, and one ounce of the essential oil of juniper, and mix or combine the whole by heat applied to the vessel in which they may be placed. To such I sometimes add about one ounce of gum arabic, which for some purposes improves the composition.

The composition is to be applied to the bobbin or surface by means of a cotton rubber or cushion, on which it is to be first laid, a quantity of linseed-oil being afterward laid on the composition. After a sufficient body of the composition may have been rubbed on the bobbin or article to be covered with it, a small amount of sulphuric ether may be put on the rubber, and with such the surface of the composition may be brought to a high finish or polish.

I do not confine the ingredients of the composition to the precise proportions hereinbefore given, as they may be varied somewhat without materially varying the compound.

I do not herein claim as my invention a spirit varnish as described in page 1261 of Cyclopedia of Practical Receipts.

I make no use of turpentine-varnish with the sandarach and shellac, preferring to employ not only a different essential oil from that used in making turpentine-varnish, but a gum having very different properties from copal, as used in the formation of turpentine-varnish—that is to say, I use gum arabic when gum may be a desirable addition to my special composition.

Furthermore, the essential oil I use in very small quantity, comparatively speaking. The same may be said with respect to the gum arabic, thereby avoiding the disagreeable or offensive and other undesirable qualities incident to the turpentine and copal, and obtaining a composition which works much easier, is susceptible of a better or finer polish, and is not so liable to oxidate or change color.

I therefore claim as my invention—

The improved composition, made of spirits of wine, gum shellac, gum sandarach, and oil of juniper alone, or such and a small amount of gum arabic, as stated.

WILLIAM BROOKS.

Witnesses:
R. H. EDDY,
S. N. PIPER.